Sept. 12, 1967 V. E. HAMILTON ETAL 3,341,391
SPHERICAL SHAPED PLASTIC FILTER FOR CATHODE RAY TUBE
Filed April 8, 1964

VERN E. HAMILTON
LUTHER M. ROSELAND
INVENTORS

BY Max Gilden
ATTORNEY 3,341,391
SPHERICAL SHAPED PLASTIC FILTER FOR
CATHODE RAY TUBE
Vern E. Hamilton, Palos Verdes Estates, and Luther M. Roseland, Santa Ana, Calif., assignors, by mesne assignments, to McDonnell Douglas Corporation, Santa Monica, Calif., a corporation of Maryland
Filed Apr. 8, 1964, Ser. No. 358,222
4 Claims. (Cl. 161—3)

This invention relates to polycarbonate and polystyrene plastic laminates, and is particularly concerned with the fabrication of transparent plastic laminates formed from a plurality of layers of polycarbonate or polystyrene thermoplastic films or sheets, bonded together by a cured urethane polymer resin.

Increasing interest in polycarbonate sheets and films has been developed recently due to the outstanding physical, thermal, and electrical properties of this material. Thus, polycarbonates are very tough over a broad temperature range and have high tensile strength and elongation, and show good retention of strength characteristics at increasing temperatures. Also, relatively wide usage has been made of polystyrene thermoplastic sheets and films because of the physical properties of this material, including its excellent dimensional stability and satisfactory strength, and its good thermal and electrical properties. Of particular importance, transparent polycarbonate and polystyrene sheets and films have good optical clarity and have outstanding light-transmission characteristics over the visible spectrum. Hence, polycarbonate and polystyrene films and sheets have become attractive for use in photography, as light lenses, and as light-transmission films when applied over cathode ray tubes.

Thus, for example, such polycarbonate and polystyrene thermoplastic films and sheets are especially suited for producing a space lattice type light filter body, useful for positioning over a cathode ray tube to intercept off-axis ambient light rays and improve the contrast of an image transmitted by said tube. The general construction and principles of operation of such filter are disclosed in the copending application of Vern E. Hamilton, Ser. No. 230,644, filed Oct. 15, 1962. In making a filter of the type disclosed, a plurality of transparent polycarbonate or polystyrene films or layers are bonded together to form a laminate comprising the filter body. Each layer of plastic in such laminated filter body constitutes a separate filter body element on which is superimposed an image or geometric pattern, for example, by photography, printing, dye transfer, or by a diazo process. These respective layers or filter body elements in the form of polystyrene or polycarbonate film on which is superimposed a grid pattern, e.g., a printed ink grid pattern, must be superimposed on each other and bonded together with the patterns or images of the respective layers in accurate depthwise registry or alignment with each other to form a unitary light filter body.

When the layers are initially assembled and bonded together as described above, the filter body is a flat laminate and the depthwise aligned grid patterns provide a multiplicity of closely spaced depthwise directed viewing cells which are collimated. The filter body in this form is fully capable of use for the intended purpose. It has been so used in the past and will continue to be so used in the future in many installations. However, there are various advantages, which will not be discussed here, in forming the filter body to the same spherical curvature as the front wall of the cathode ray tube whether or not it is directly secured thereto. The usual procedure is to hot blow the laminate as though it were a single sheet. This is done by mounting the filter body in a hoop frame, heating it to forming temperature, and applying air pressure to one side to force it out spherically. While held in this shape the part is cooled, and thereafter will retain the new shape in the absence of deliberate rework. However, as would be expected, the outer sheets are slightly elongated and the inner sheets are slightly shortened about the neutral axis which is at an intermediate point in the thickness of the laminate, and the result is that the viewing cells lose their collimation and become divergent outwardly toward the viewer. This difficulty must be overcome either initially or after the part has been formed.

In the copending application of Vern E. Hamilton for patent on Method of Producing Ambient Light Trapping Filter, filed Apr. 8, 1964, Ser. No. 358,297, there is disclosed a method of making space lattice-type ambient light trapping filters from layers of plastic material having identical grid patterns printed thereon. The method comprises laying up a desired number of such layers with a suitable catalytic curing cement therebetween, aligning the layers with the grid patterns in depthwise registry, placing the assembly in a hoop type forming fixture, and blow forming the assembly to a spherical shape having the desired spherical radius. The blanks are circular and the clamping frame of the fixture is circular. Thus, the stresses and strains are rather uniformly distributed. To accomplish the forming, the plastic laminate is quickly heated to a forming temperature, as by placing it in an oven or subjecting it to radiant heat for a few minutes, air pressure is applied to one side, and it is bulged to the desired spherical shape. It is then quickly cooled, preferably to room temperature, and each individual layer is now set and will resist changes in shape and dimension. All of the above operation takes place in only a few minutes, and the curing of the cement has progressed only moderately. While the cement holds the layers intimately together, it is still subject to creeping or "cold flow" in response to shear stresses.

When the part has been formed as described above, the viewing cells are divergent outwardly because the outer layers were stretched and the inner layers were compressed, considered in terms of their general plane. The next step is to cool the part, then to reverse its curvature or "snap it through" so that the convex outer layer becomes the concave inner layer and the concave inner layer becomes the convex outer layer. The layers are elastically strained to their new dimensions, and again the viewing cells diverge outwardly. Since each layer wants to retain its set dimension, or return to it, there is now a high tensile stress in the outer layer and a high compressive stress in the inner layer. Because the cement has been properly chosen for its adhesive qualities, strength, and curing rates, among other characteristics, it will now gradually creep or cold flow as the layers attempt to regain their set dimensions, and the viewing cells will gradually converge until they are collimated. By this time about half the stress has been relieved in the plastic and the cement is approaching complete cure so that its resistance to further shear is very high. The curing can be controlled so that the process can be stopped before, approximately at, or after collimation.

It will be seen that an adhesive or cement is required for the practice of the above process which will have adequate strength to hold the layers together, but which will have the creep characteristics to allow enough shearing to achieve collimation. The curing should be sufficiently controllable to stop the shearing at any desired point. The adhesive bond must have high clarity and light transmission value and must be compatible with the plastic materials chosen for the filter and the material used for producing the grid markings, that is, the adhesive should be inert with respect to the plastic layers and the ink forming the grid markings, and should wet the ink markings as well as the clean area between the markings to produce a strong, continuous optically clear bond between the layers of plastic. The plastic materials must be clear and highly transparent, strong and stable in the temperature ranges to which they are subjected, and flexible enough at room temperature to withstand the "snap through" reverse bending step. The improved laminate and light filter bodies formed using these plastic and adhesive materials are the subject matter of the invention disclosed and claimed herein.

Certain of the improved adhesive materials or compositions employed in producing such laminates and light filter bodies are the subject matter of the invention disclosed and claimed in the copending application of Luther M. Roseland for Bonding Material for Plastic Laminates, Ser. No. 358,241, filed of even date herewith.

It is accordingly an object of this invention to provide a transparent polycarbonate or polystyrene thermoplastic laminate bonded together by a strong, transparent adhesive.

Another object of the invention is the provision of a transparent laminate formed of a plurality of films or sheets of polystyrene or polycarbonate plastic, bonded together by an adhesive between each of the adjacent layers, which adhesive in the partially cured stage has the ability to "creep" between the adjacent films of plastic and form itself into a thin, uniform layer substantially without rupture, when the laminate is subjected to shear stresses or loading.

Another object is to provide a spherically shaped laminate composed of a plurality of plastic films or layers of transparent thermoplastic polycarbonate or polystyrene having a strong, thin, transparent special type bonding layer between adjacent films or layers of plastic.

Still another object is the provision of a spherically shaped transparent filter body composed of a spherically shaped laminate formed of a plurality of plastic films or layers of transparent thermoplastic polycarbonate or polystyrene having a strong, thin, transparent special type bonding layer between adjacent films or layers of plastic, the respective plastic layers having depthwise aligned grid patterns formed thereon.

A still further object is to form a transparent plastic laminate from a plurality of thermoplastic films of polystyrene or polycarbonate, on which are superimposed a grid or cellular pattern, preferably by printing with a dye type ink, and employing an adhesive or bonding material between the respective layers, said adhesive having the property when partially cured of "creeping" or deforming with time under a shear load while maintaining the adjacent films in tight adhering engagement, and to form a thin, transparent, strong, flexible glue line between such layers upon curing of the laminate, said adhesive being inert with respect to the plastic substrate and the printed dye pattern.

Other objects and advantages of the invention will appear hereinafter.

It has been found that polyurethane resins provide a thin, strong, transparent bond between adjacent films of transparent thermoplastic polystyrene or polycarbonate, permitting formation of a strong transparent laminate composed of a plurality of such films by a bonding procedure carried out readily and at low temperatures, avoiding distortion of the layers of the laminate. The urethane polymer adhesive formulations employed as the bonding material between the adjacent films of polystyrene or polycarbonate have low viscosity, permitting easy application and uniform flow over the surface of the film, and substantially wetting the entire surface area to which it is applied and forming a void-free film. Such urethane polymer adhesive formulations do not adversely react with the polystyrene or polycarbonate substrate, or with any dye type inks forming the above-mentioned printed grid patterns on the surface of the film, and have high adhesion to these substrates. Where a dye-printed grid pattern is superimposed on the surface of the polystyrene or polycarbonate films, the urethane polymer adhesive formulation wets and adheres to such printed surfaces, forming a continuous adhesive bond between the layers of polystyrene or of polycarbonate. Of particular importance, under shear stress loading of a laminate of polycarbonate or polystyrene layers bonded by the urethane polymer adhesive, for example, after the reverse bending operation for producing the space lattice-type light filter body, as described above, such urethane polymer adhesive, in the partly cured stage as described more fully below, holds the adjacent sheets or films of the laminate together, without delamination of the layers, and cold flows or "creeps" without rupture of the adhesive bond. This cold flow or "creeping" characteristic of the urethane polymer adhesive in partially cured form permits slight displacement of the respective layers of the laminate under shear stress and permits registry or alignment of the grid patterns in the respective layers, where the respective layers carry patterns which require proper registration, as previously noted. After complete curing of the laminate, the polyurethane adhesive undergoes a permanent set, forming a tough but flexible thin bonding film.

The thermoplastic polycarbonate or polystyrene films generally employed to form laminates, e.g., of the types noted above, are of a thickness of about 1 to about 10 mils. However, it will be understood that the invention is not to be taken as limited by any particular thickness of the polystyrene or polycarbonate substrate.

Various types of liquid urethane polymers or elastomers can be employed to produce the adhesive formulations employed as bonding material for the polystyrene or polycarbonate films according to the invention. These materials can be cured to a strong, flexible or rubbery solid material. Illustrative of the liquid urethane polymer base materials of these adhesive formulations are the "Adiprene L" series of liquid urethane elastomers marketed by Du Pont. These materials are fully saturated polymers which contain, e.g., from about 4.0 to about 10% isocyanate groups by weight. Typical specific examples of such liquid urethane elastomers are the Adiprenes L–100, L–167, and L–315. Such urethane elastomers are understood to be reaction products of polytetramethylene ether glycol and tolylene diisocyanate. The L–100 material contains about 4.0% to about 4.3% isocyanate groups by weight, the L–167 material about 6.1% to about 6.5% isocyanate groups, and the L–315 material about 9.2% to about 9.6% isocyanate groups. These polymers are cured by reaction of the isocyanate group with curing agents, e.g., polyamines or polyol compounds. These materials can also be cured by reaction with the moisture present in the air, but this is difficult to control consistently with varying relative humidity, and requires relatively prolonged curing time and is therefore not preferred. A preferred urethane elastomer for purposes of the invention is Adiprene L-100 because of its high flexibility.

Specific examples of polyamine and polyol curing agents which are preferably employed in the liquid urethane polymer adhesive formulations used in producing the invention laminate are 4,4'-methylene-bis-(2-chloroaniline), triethanolamine, 1,4-butanediol, castor oil, diethylene triamine, diamino diethylamine, and the like. Triethanolamine has been found particularly suitable.

It has been found, in accordance with the invention disclosed and claimed in the above copending application Ser. No. 358,241 of Luther M. Roseland, that the addition of a polypropylene glycol to the adhesive formulation of liquid urethane polymer and curing agent, preferably polyamine or polyol curing agent, is particularly advantageous for laminating polycarbonate films, and especially polystyrene films, to provide a strongly adherent, transparent laminate. Thus, the polypropylene glycol decreases the viscosity of the polyurethane liquid, increases the adhesion between the adjacent plastic layers of the laminate, and increases the transparency of the adhesive layer.

The polypropylene glycol added to the adhesive formulation also aids in adjusting the "creep" or cold flow characteristics of the adhesive. When producing a space lattice-type filter body in the form of a laminate as described above, such cold flow characteristics permit obtaining proper depthwise alignment or collimation of the grid patterns or cells which are printed or otherwise formed on the adjacent plastic films of the laminate, as described above, while at the same time providing high adhesion of the adjacent layers. Thus, the polypropylene glycol leaves the adhesive soft enough following the initial cure so that the adjacent layers of the polystyrene or polycarbonate plastic are held firmly together while at the same time having the ability to creep under the application of a shear stress so as to align adjacent cells of adjacent films.

The polypropylene glycols which can be employed in the adhesive formulation are those which have an average molecular weight generally in the range of about 150 to about 2,000, preferably 300 to about 1,000, the lower molecular weight materials being preferred. A particularly suitable polypropylene glycol is one having a molecular weight of about 400, e.g., the material marketed as P–400 by Dow Chemical Company. The polypropylene glycols marketed as the "Ucons" by Union Carbide Chemicals Company, and having average molecular weights within the above-noted ranges, can also be employed.

Optional materials which can be added to the adhesive formulation hereof are the monohydric alcohols such as ethanol and isopropanol, particularly where the plastic films to be laminated are polystyrene. Such alcohols cut the viscosity of the formulation and confer greater clarity on the adhesive binding layer of glue line. Such alcohols also improve the adhesion of adjacent films of the plastic material, especially in the case of polystyrene, which is usually more difficult to bond than polycarbonate. However, particularly where the polypropylene glycol material noted above is added to the formulation, as is done in preferred practice, especially for bonding polystyrene films, the monohydric alcohols can be omitted.

Also, there can be added optionally to the adhesive formulation a trace of a whitener, e.g., the whitener marketed as Perox blue, and understood to be an anthraquinone dye. The trace amount of whitener thus added to the formulation tends to mask off any yellow coloration which sometimes is imparted to the thin bonding or adhesive layer following curing.

The proportions of the polyamine or polyol curing agent which can be incorporated with the liquid urethane polymer base material can range, by weight, from as little as about 0.5 part to as much as about 60 parts of the curing agent per 100 parts of the urethane polymer liquid. However, the proportions of any specific curing agent employed with the urethane polymer liquid can vary considerably within the above-noted range, depending on the particular curing agent employed. Thus, for example, the preferred proportions of certain specific curing agents which can be used in the urethane polymer adhesive formulation are set forth in the table below.

TABLE I

|  | Parts by weight | | | |
|---|---|---|---|---|
| Urethane polymer liquid (Adiprene L–100) | 100 | 100 | 100 | 100. |
| 4,4′ methylene bis-2-chloroaniline | 5 to 20 | | | |
| Triethanolamine | | 2 to 12 | | |
| Castor oil | | | 20 to 60 | |
| 1,4-butanediol | | | | 0.5 to 5. |

The butanediol noted in Table I above is generally employed in combination with another curing agent such as castor oil.

The proportion of polypropylene glycol which can be employed in the adhesive formulation can range, by weight, from about 5 to about 30 parts, preferably about 10 to about 20 parts, per 100 parts of the urethane polymer liquid, e.g., Adiprene L–100.

Where employed, the amount of monohydric alcohol such as ethanol or isopropanol which can be added to the adhesive formulation can range from about 2 to about 10 parts by weight per 100 parts of the urethane polymer liquid. Where a whitener, e.g., an anthraquinone dye whitener, is employed, only a trace of this material is used in the urethane polymer liquid.

The following example illustrates preferred adhesive formulations employed in producing the polystyrene or polycarbonate laminates of the invention:

EXAMPLE 1

*Composition A*

| Components: | Parts by weight |
|---|---|
| Adiprene L–100 | 100 |
| Polypropylene glycol (Dow's P–400) | 20 |
| Triethanol amine | 5.2 |

*Composition B*

| | |
|---|---|
| Adiprene L–100 | 100 |
| Polypropylene glycol (Dow's P–400) | 15 |
| Triethanol amine | 4.6 |
| DPI–7 (Du Pont)—a eutectic mixture of cumene diamine and meta phenylene diamine | 0.6 |

The following example illustrates additional adhesive formulations which can be employed in producing the invention laminates:

EXAMPLE 2

*Composition C*

| Components: | Parts by weight |
|---|---|
| Adiprene L–100 | 100 |
| 4,4′-methylene-bis-(2-chloroaniline) | 11 |

*Composition D*

| | |
|---|---|
| Adiprene L–100 | 100 |
| Triethanol amine | 5.2 |

*Composition E*

| | |
|---|---|
| Adiprene L–100 | 100 |
| Castor oil | 20 |
| 1,4 butanediol | 2 |

*Composition F*

| | |
|---|---|
| Adiprene L–100 | 100 |
| Triethanol amine | 5.2 |
| Ethanol | 5.2 |

In each of Compositions A to F above, Adiprene L–100 can be replaced by Adiprene L–167 or Adiprene L–315. Also, in Compositions A and B above, the polypropylene glycol P–400 can be replaced in each case by a polypropylene glycol having an average molecular weight of about 700.

The accompanying drawing illustrates the method of producing a transparent laminate in the form of a lattice-type light filter body, according to the invention principles. In the drawing.

Figure 2:
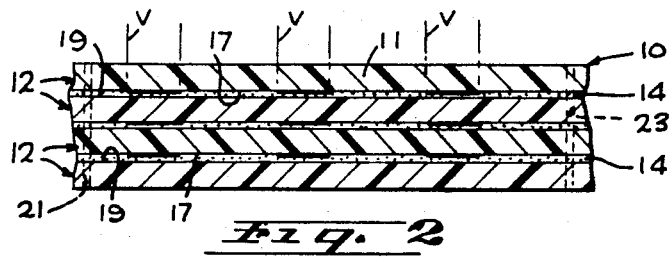
FIG. 2 is a section of a laminate formed by adhesively bonding together a plurality of the films shown in FIG. 1, and taken on line 2—2 of FIG. 1.

The illustrations in the drawings are exaggerated for purposes of greater clarity.

Figure 1:
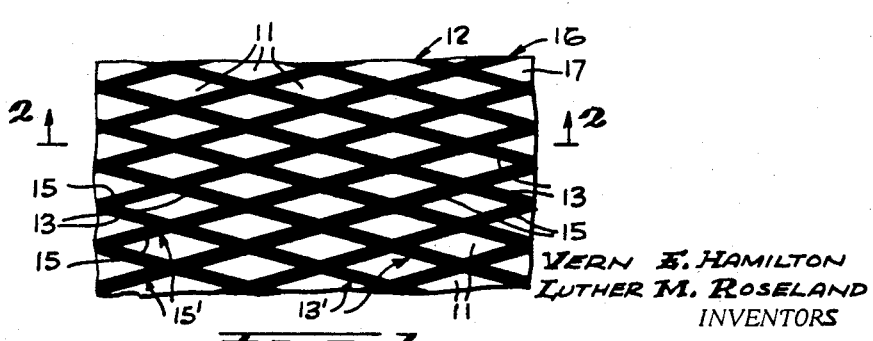
FIG. 1 is a plan view of one layer or film of a thermoplastic, e.g., polycarbonate or polystyrene, film having a printed geometric pattern in the form of grids or cells formed thereon.

Referring to FIG. 1 of the drawing, each of the films of transparent polystyrene or polycarbonate, represented by numeral 12, has a printed grid pattern 16 superimposed on one surface 17 thereof, as, for example, by printing, using a dye type of ink. As seen in FIG. 1, the grid pattern 16 on each film 12 is in the form of a plurality of like diamond-shaped cells or grids 11, arranged in horizontal and vertical rows, each cell having opposite parallel sides 13 and 15. Such grid pattern is formed by two sets of parallel lines 13' and 15' crossing each other at a suitable angle. The size of the grid pattern illustrated in FIG. 1 is exaggerated for the purpose of clarity. In one embodiment, the ratio of the width of the lines 13' and 15', forming the diamond grid pattern, to the spaces between the adjacent grid lines, is about 1 to 3. For example, the lines 13' and 15' can have a width about equal to the thickness of the polystyrene or polycarbonate films, e.g., about 5 mils thick. The layers must be secured together to form the laminate as described below, so that the grids of adjacent layers are in very accurate registry.

To provide such laminate, the respective layers or films of transparent polystyrene or polycarbonate are coated with a urethane polymer adhesive formulation containing the curing agent, e.g., composition A above, and the layers are placed one atop the other with the printed surface 17 of one layer adjacent an unprinted surface 19 of an adjacent layer. The respective layers are aligned by means of alignment pins passed through aligned holes 21 and 23 at opposite ends of each of the films, as seen in FIG. 2, so that the grid patterns of adjacent layers are in accurate registry or alignment, and the viewing cells of adjacent layers are in parallel or collimated registry as indicated at V.

The resulting unit or laminate 10 thus formed, composed of a plurality of layers of any desired number, e.g., 6 to 12 layers, of the above-noted plastic film, with adjacent layers having an adhesive bonding film 14 of the urethane polymer adhesive, is placed in a heated press. The laminate is subjected to pressure and is maintained either at ambient temperature or at elevated temperature of the order of about 150° to about 175° F. During this initial curing period, the adhesive bond between the adjacent plastic layers 12 becomes partially cured. Where this partial curing operation takes place at about room temperature, about 8 to about 20 hours precuring time is required. On the other hand, if the initial or partial curing operation is carried out at elevated temperature of about 150° to about 175° F., the time period for the initial curing operation is reduced to about 3 to about 8 hours. It is preferred to carry out the partial curing operation at room temperature, since it has been found that, when forming a laminate according to the invention and composed of a number of layers, distortion of the laminate or of the individual layers tends to occur at elevated initial curing temperatures. The temperature at which the partial curing operation is made to take place also depends on the particular adhesive formulation employed. Pressure is required during this initial stage of partial curing in order to obtain a thin glue line generally less than about 1 mil thick, preferably of the order of about 0.1 mil thick, between adjacent layers of polystyrene or polycarbonate film 12.

The resulting partially cured laminate, as seen in FIG. 2, is a flat laminate, in which the depthwise aligned grid patterns of the respective plastic layers provide a multiplicity of closely spaced viewing cells 11. Such laminate is then removed from the press, the positioning or aligning pins are removed from holes 21 and 23, and the laminate is then subjected to a "forming" operation. In this operation the laminate is placed in a hoop-type retaining jig (not shown), the assembly rapidly heated to forming temperature, as by placing the assembly in a suitable oven (not shown), and the laminate blown to a spherical shape, as illustrated at 20 in FIG. 3, by fluid pressure applied against the concave inside surface of the laminate, indicated at 25. The laminate is heated to an elevated forming temperature for a short period sufficient to soften the laminate so as to permit forming or shaping the same at relatively low pressure. Thus, for this purpose, in the case of a polycarbonate laminate, temperature of the laminate preferably is raised to a temperature of from about 350° to about 400° F., and in the case of a polystyrene laminate, temperature preferably is raised to a temperature between about 240° and about 280° F.

The adhesive holds the layers intimately together during the forming operation, and the forming temperature applied in each instance is not so high as to cause an adverse effect on the adhesive bonding material, such as excessive curing or delamination, on the plastic substrate, or on the dye-printed pattern thereon. The laminate is then quickly cooled, preferably to room temperature, and at this stage the laminate is not sufficiently rigid to resist changes in shape or dimensions. The time period of this forming operation from the commencement of heating to the cooling of the laminate ranges from about 2 to about 10 minutes, e.g., about 5 minutes. During the forming operations, the curing of the adhesive progresses to some extent, but is preferably kept to a minimum in order to preserve the flexibility and cold flow characteristics of the adhesive which are of importance in the subsequent reverse bending operation.

Figure 3:
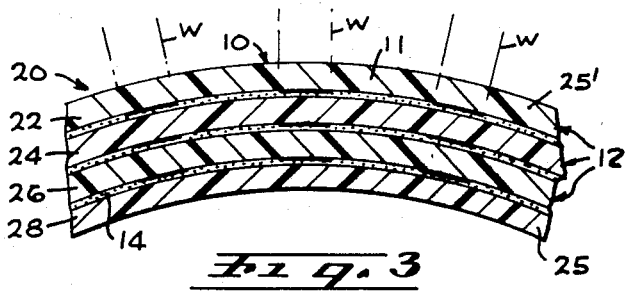
FIG. 3 illustrates the spherical shape of the laminate of FIG. 2, after the latter is subjected to the forming operation with the cells diverging.

The blowing pressure is then removed, and the laminate in the shape illustrated in FIG. 3 is withdrawn from the forming jig. As seen in FIG. 3, the viewing cells 11 of adjacent plastic layers are no longer collimated and become outwardly divergent, as indicated at W in FIG. 3, due to the stretching of the outer layers, e.g., 22 and 24, and compression of the inner layers 26 and 28 during the forming operation. In order to obtain a light filter which intercepts off-axis ambient light rays as previously described, and having constant light-transmission characteristics over the entire viewing area when such filter is positioned over a cathode ray tube, the grid patterns of adjacent layers must be oriented in depthwise registry so as to again provide collimation of the viewing cells as shown at V in FIG. 1, substantially without changing the spherical shape of the laminate produced in the forming operation and shown in FIG. 3.

Figure 4:
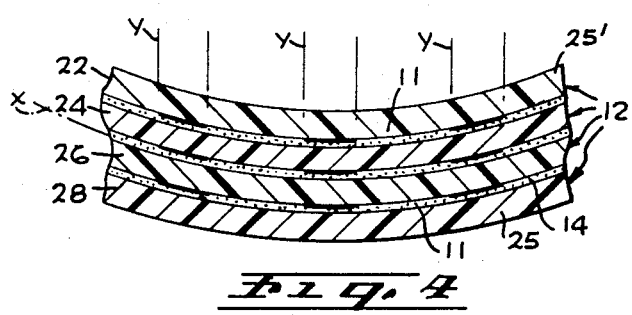
FIG. 4 shows the laminate of FIG. 3 after being turned or snapped inside out by stressing in the opposite direction, and after the stress-relieving action has realigned the cells.

To accomplish this, the laminate 10, after cooling, is then snapped inside out, as illustrated in FIG. 4, by application of a manual force as by applying thumb pressure to diagonally opposite ends of the laminate, or by evacuating the chamber which was previously pressurized to form the laminate, so that the previous inside surface 25 of the spherical laminate is now the convex outside surface, and the previous outside surface 25' of the laminate is now the concave inside surface, as indicated in FIG. 4, the laminate otherwise having the same spherical shape as it had following forming. Since this bending operation was accomplished at temperatures below the melting point of the plastic laminate, it produces varying stresses in the respective layers. Now there is a high tensile stress in the outer layers 26 and 28, and a high compressive stress in the inner layers 22 and 24, and again the viewing cells diverge outwardly as at W in FIG. 3.

However, the partially cured polyurethane adhesive bond has the important characteristic that it is still at a stage which permits it to "creep" or cold flow, and under the above-noted shearing loads or stresses, the adhesive now gradually creeps or cold flows, holding the adjacent layers together without bond rupture, while the layers 22, 24, 26 and 28 become slightly displaced in a direction and an amount determined by the position of each layer relative to the neutral or central axis X of the laminate, as seen in FIG. 4, in order to regain their set dimensions. During such cold flow of the adhesive bond and gradual displacement of the layers, the viewing cells 11 of the adjacent layers gradually converge. This cold flow continues until the layers are displaced an amount such as to approach or to obtain substantial collimation or alignment of the viewing cells 11 of adjacent layers as indicated at Y in FIG. 4. By this time the adhesive has approached substantially complete cure so that its resistance to further shear is high, and further displacement of the layers of the laminate substantially ceases. The obtaining of substantial collimation of the viewing cells following the snap-through the spherical laminate produced in the forming operation may require a period of several hours, e.g., of the order of about 6 to about 15 hours.

The above series of operations provide a spherically shaped lattice-type light filter body, which is shaped to overlay a cathode ray tube, and which can be attached thereto, as by an adhesive, the laminate or filter body providing maximum contrast enhancement as result of the depthwise alignment or collimation of the filter cells 11 of the respective layers.

It is accordingly seen that the urethane polymer adhesive noted previously is peculiarly and eminently adapted for the production of a transparent spherical light filter body of the type described above. Thus, the urethane polymer adhesive has the ability and strength to hold the layers of polystyrene or polycarbonate forming the filter body laminate together, but such adhesive in the partially cured condition possesses "creep" or cold flow characteristics to permit sufficient recovery of the respertive layers of the laminate following the reverse bending operation, to achieve collimation of the viewing cells, and the curing is sufficiently controllable to stop such displacement of the respective layers at a stage approaching or approximately at collimation. The adhesive bond thus produced has high clarity and light-transmission value, and is compatible with all of the elements of the laminate, including the plastic layers and the ink markings thereon. The polystyrene and polycarbonate films forming the laminate are clear and highly transparent, are strong and stable, e.g., within the temperature ranges to which these materials are heated during the forming operation, and such materials are sufficiently flexible at room temperature to withstand the snap-through reverse bending operation.

The following are examples of practice of the invention for producing transparent plastic laminates or light filter bodies, according to the invention.

EXAMPLE 3

Ten layers or films of transparent polycarbonate, each layer having a thickness of about 5 mils, and having a diamond grid dye-printed pattern on one surface thereof, e.g., as described above and shown at 16 in FIG. 1 of the drawing, are laid up in laminar form and registered, as described above and shown in FIG. 2, with the urethane polymer adhesive formulation, Composition D above, being disposed between adjacent films or layers of the polycarbonate, forming nine glue lines.

The laminate unit is subjected to pressure and partially cured at room temperature about 8 to 12 hours. The laminate is then rapidly heated to a temperature of about 375° F., and subjected to the forming operation above described and illustrated in FIG. 3, to cause the laminate to assume a spherical shape, and the laminate is then cooled. Such forming and cooling process takes place in a period of about 5 minutes. The unit is then snapped inside out and the respective layers of polycarbonate are held in firm engagement by the adhesive, while at the same time, under the shear load applied in the reverse bending operation, as above described, slight displacement of the respective layers of the laminate occurs, during which period the adhesive creeps or cold flows, without rupture of the adhesive bond, such adhesive bond having a thickness of about 0.1 mil between the respective layers. Such cold flow continues for a period of about 8 to 10 hours, to provide the spherically shaped light filter body illustrated in FIG. 4, and having the viewing cells 11 of the adjacent layers collimated as seen in FIG. 4.

The resulting laminate is a highly transparent light filter body which can be placed over a cathode ray tube and adhesively secured thereto, if desired, to permit substantially complete transmission of light through said tube while intercepting off-axis ambient light rays.

EXAMPLE 4

Six films or layers of transparent polystyrene, each layer having a thickness of about 5 mils, are coated with the urethane polymer adhesive formulation, Composition B above, and the layers superimposed over each other to form a laminate having five adhesive bonding or glue lines, according to the procedure of Example 3. Each of the polystyrene films has a printed grid pattern similar to that of FIG. 1, forming a plurality of cells, the grid patterns of the respective layers being in registry as seen in FIG. 2. The multi-layer unit thus formed is placed in a press and partially cured under pressure at room temperature for about 8 to 12 hours.

The laminate thus formed, having the partially cured adhesive or bonding layers, is then rapidly heated to about 250° F. and subjected to a forming operation as described above and in Example 3, and then cooled quickly, the entire operation taking place in a period of about five minutes, to produce a laminate of spherical shape.

The spherical laminate produced in the forming operation is then snapped through, as described above, followed by progressive creeping and cold flow of the adhesive as described above for a period so as to form a completely transparent, spherically shaped strong light filter body in which the respective grid patterns of the adjacent layers are oriented with the viewing cells of adjacent layers in depthwise collimation, as shown in FIG. 4. The resulting filter body can be placed over a cathode ray tube, permitting high light transmission from an image transmitted by said tube, while filtering out ambient light rays and providing sharp image contrast.

EXAMPLE 5

A transparent plastic laminate formed of polystyrene films or layers each having a grid pattern of the type illustrated in FIG. 1 and described above, is produced substantially according to the procedure of Example 3 above, employing in place of adhesive Composition D, the urethane polymer adhesive formulation A.

The resulting laminate in the form of a high strength spherical light filter body is particularly adapted for use over a cathode ray tube and has light-transmission and ambient ray filtering characteristics similar to the light filter body produced in Example 3.

EXAMPLE 6

A polycarbonate filter body laminate is produced by procedure similar to that of Example 3 above, except that the adhesive employed is the urethane polymer adhesive Composition C above.

A strong transparent spherical laminate is provided having light transmitting and ambient light filtering characteristics similar to the laminate of Example 3.

EXAMPLE 7

A polystyrene laminate formed of approximately 8 layers of polystyrene film each having a dye-printed grid pattern similar to that illustrated in FIG. 1, is produced by a process similar to that of Example 3 above, except that the adhesive employed is the urethane polymer formulation, Composition E above. A transparent spherical light filter body laminate, the individual layers of which are highly adherent, is produced, which can be secured by suitable means over a cathode ray tube, substantially improving the contrast of an image transmitted by said tube.

The invention has been described particularly in relation to the production of a laminate which is formed of individual layers on which are superimposed a geometric grid pattern, as shown in FIG. 1, and the laminate produced is spherically shaped so as to form a light filter body having particular usefulness when positioned over a cathode ray tube for enhancing the contrast of an image transmitted through the tube, preferably without significantly reducing the amount of transmitted light. However, it will be understood that the principles of the invention can be applied to produce spherical transparent light filter laminates having grid patterns different from those illustrated in FIG. 1. Of particular note, it will be understood that the adhesive principles of the invention have general utility in the laminating art, and, for example, can be applied to the formation of laminates composed of individual layers of polystyrene or polycarbonate which may or may not have geometric grid patterns superimposed thereon, as described above, and which can be flat or made into various shapes, the resulting laminates having other applications, e.g., as a light lens or as a light-transmission medium having high strength characteristics.

From the foregoing, it is seen that the invention provides a strong, highly transparent laminate or filter body having high light transmission and formed from a plurality of films or layers of polystyrene or polycarbonate adhesively bonded by a strong, thin layer of a polyurethane resin having excellent strength and light-transmission characteristics, and particularly suited as an ambient light filter over cathode ray tubes.

While particular embodiments of the invention have been described for the purpose of illustration, it should be understood that various modifications and adaptations thereof may be made within the spirit of the invention, as set forth in the appended claims.

We claim:
1. A transparent light filter body comprising a plurality of layers of plastic film selected from the group consisting of polycarbonate and polystyrene, each of such layers having grid patterns superimposed thereon, said grid patterns of adjacent layers being substantially in depthwise alignment, said layers being adhesively bonded together by a cured transparent urethane polymer, said filter body being spherically shaped and adapted to fit over a cathode ray tube.

2. A transparent light filter body comprising a plurality of layers of plastic film selected from the group consisting of polycarbonate and polystyrene, each of said layers having a dye-printed geometric grid pattern superimposed on at least one surface thereof and forming a multiplicity of viewing cells, said layers being adhesively secured together by a cured transparent urethane polymer, and forming a transparent laminate, said laminate being spherically shaped and adapted to fit over and match the contour of a cathode ray tube, the grid pattern of adjacent layers being in depthwise alignment and said viewing cells being collimated.

3. A transparent light filter body comprising a plurality of layers of plastic film selected from the group consisting of polycarbonate and polystyrene, each of said layers having a dye-printed geometric grid pattern superimposed on one surface thereof, and forming a multiplicity of viewing cells, said layers being adhesively bonded together by a transparent solvent-free urethane polymer cured by a member selected from the group consisting of polyamine and polyol compounds, and forming a laminate, the surface of one layer of plastic film having a grid pattern thereon being disposed adjacent the unprinted surface of an adjacent layer of plastic film, said laminate being spherically shaped and adapted to fit over and match the contour of a cathode ray tube, the grid pattern of adjacent layers being in depthwise alignment and said viewing cells being collimated.

4. A transparent light filter body comprising a plurality of layers of plastic film selected from the group consisting of polycarbonate and polystyrene, each of said layers having a geometric grid pattern superimposed thereon, and forming a multiplicity of viewing cells, said layers being adhesively bonded together by a transparent urethane polymer cured by a mixture of polypropylene glycol and a member selected from the group consisting of polyamine and polyol compounds, and forming a laminate, said laminate being spherically shaped and adapted to fit over and match the contour of a cathode ray tube, the grid pattern of adjacent layers being in depthwise alignment and said viewing cells being collimated.

References Cited

UNITED STATES PATENTS

| | | | |
|---|---|---|---|
| 2,980,567 | 4/1961 | Steel | 161—1 X |
| 3,117,046 | 1/1964 | Klockgether et al. | |
| 3,133,853 | 5/1964 | Know | 161—190 |
| 3,170,178 | 2/1965 | Scholl. | |
| 3,194,885 | 7/1965 | Hamilton | 88—14 |
| 3,255,068 | 6/1966 | Smith | 161—190 |

JACOB H. STEINBERG, *Primary Examiner.*